United States Patent [19]
Kelly et al.

[11] Patent Number: 4,577,068
[45] Date of Patent: Mar. 18, 1986

[54] ADAPTIVE MODULAR TELEPHONE CRADLE FOR A COMMUNICATION TERMINAL

[75] Inventors: Thomas J. Kelly, Colts Neck; Daniel W. Tyler, Middletown, both of N.J.

[73] Assignee: AT&T Information Systems Inc., Holmdel, N.J.

[21] Appl. No.: 554,540

[22] Filed: Nov. 23, 1983

[51] Int. Cl.⁴ .............................................. H04M 1/00
[52] U.S. Cl. .......................... 179/100 R; 179/146 R; 179/146 E; 179/179; D14/52; D14/101
[58] Field of Search .................... 179/178, 179, 146 R, 179/100 R, 100 C, 2 DP, 2 TV; D14/101, 52, 56, 53

[56] References Cited

U.S. PATENT DOCUMENTS

| D. 246,651 | 12/1977 | Morrison et al. | D14/53 |
| D. 270,248 | 8/1983 | Fukushima et al. | D14/53 |
| 2,826,641 | 3/1958 | Sarigisson et al. | 179/100 |
| 3,073,911 | 1/1963 | Mattke et al. | 179/100 C |
| 3,538,267 | 11/1970 | Ross | 179/146 R |
| 4,107,477 | 6/1978 | Morrison | 179/99 |
| 4,292,477 | 9/1981 | Adams et al. | 179/100 C |
| 4,349,706 | 9/1982 | Thompson | 179/100 C |
| 4,355,212 | 10/1982 | Kosten | 179/100 C |
| 4,368,359 | 1/1983 | Genaro et al. | 179/146 R |
| 4,375,584 | 3/1983 | Muzumdar et al. | 179/100 D |
| 4,385,212 | 5/1983 | Tyler | 179/179 |
| 4,445,008 | 4/1985 | Rocca et al. | 179/179 |

FOREIGN PATENT DOCUMENTS

| 1223889 | 9/1966 | Fed. Rep. of Germany | 179/100 D |
| 3048765 | 7/1982 | Fed. Rep. of Germany | 179/100 R |

OTHER PUBLICATIONS

"The Dimension Console: Something for Everyone", Coyne et al., Bell Laboratories Record, vol. 54, Oct. 76, pp. 239-243.

Primary Examiner—Gene Z. Rubinson
Assistant Examiner—R. Vaas
Attorney, Agent, or Firm—Ronald D. Slusky

[57] ABSTRACT

There is disclosed a business communication terminal structure having a modular switchhook and cradle assembly which can be easily located on either side of the terminal housing to receive a telephone handset. The unused housing side surface aperture is covered using a blank tight fitting cover plate which blends with the terminal housing.

8 Claims, 5 Drawing Figures

ADAPTIVE MODULAR TELEPHONE CRADLE FOR A COMMUNICATION TERMINAL

FIELD OF THE INVENTION

This invention relates generally to the field of hook switch and cradle assemblies and in particular to a modular hook switch and cradle assembly integrated with a communication terminal such that the modular assembly may be readily located on either side of the terminal housing for receiving a telephone handset.

BACKGROUND OF THE INVENTION

In the last several years attention has been focused on providing modular station equipment, such as modular telephone keysets and terminals. As is well known, a telephone handset is provided for the provision of transmitting and receiving communications. Typically, the cradle and hook switch assembly are positioned on the left side of the station set for receiving the station handset. As positioned, the cradle assembly is fixed. No option is provided to allow the user to conveniently rearrange the assembly to the right side of the station set. Thus, while the station set user may expand the functions of the station set by adding modules to the station set there is no means for allowing the user to relocate the cradle assembly.

For example, U. S. Pat. No. 4,375,584 issued to Deepak Muzumdar et al on Mar. 1, 1983 discloses a modular telephone keyset structure which can be expanded to include additional functions beyond those normally provided in typical telephone keyset structures, such as adding a printer to the station set. However, a modular switchhook and cradle, one which can be readily plugged into either side of the station set housing for receiving the handset, is lacking in the Muzumdar et al modular keyset arrangement.

Alternatively, the problem could be solved by arranging the station set to have two handsets mounted on opposite sides of the station as shown in U. S. Pat. No. Des. 246,561, issued to H. J. Morrison on Dec. 13, 1977. However, such an arrangement is expensive due to the added cost of providing a second handset and a second switchhook assembly.

The same problem pertains to business communication terminals, in which, typically, the station set is an adjunct to, rather than integrated with, the terminal in a unitary housing. Attempts at integrating a station set with the terminal have been made but these attempts have been limited to integrating the station and handset with the terminal stand on which the data terminal is positioned rather than with the terminal housing.

U. S. Pat. No. 4,355,212 issued to R. B. Kostem on Oct. 19, 1982 discloses a wall telephone cradle assembly which is mounted to a two pin wall telephone receptacle plate. The Kostem arrangement may be fastened to one of the sides of a terminal housing selected by the user, however, such an arrangement would seriously detract from the aesthetic appeal of the terminal housing. Moreover, it would be cumbersome and impractical to relocate the cradle apparatus from one side of the terminal housing to the opposite side since the relocation of the telephone receptacle plate would expose screw holes in the unused side surface of the terminal that were used for bolting the receptacle to the terminal. In addition, the switchhook wiring would require rerouting.

Thus, there appears to be a need for a business communication terminal structure in which a telephone handset is integrated with a terminal housing and one which provides a modular hook switch and cradle assembly that can be readily inserted into either side of the terminal housing for receiving the telephone handset.

SUMMARY OF THE INVENTION

In accordance with our invention a telephone handset may be readily located on either side of a data terminal housing by the user. An aperture located on opposite side portions of the terminal housing is adapted to receive a modular hook switch and cradle assembly. The unused aperture receives a cover plate which blends with the terminal housing.

The modular hook switch and cradle assembly can be readily inserted into or removed from either aperture. The cradle includes a modular telephone jack for electrically connecting the handset to a station set integrated with the terminal housing. A station cable, which runs to both sides of the terminal housing from the station set, plugs into the modular switchhook and cradle assembly to complete the communication path and control connection between the handset and the station set.

BRIEF DESCRIPTION OF THE DRAWINGS

These and other objects and features together with the operation and utilization of the present invention will be more fully apparent from the illustrative embodiment shown in conjunction with the drawing in which.

DETAILED DESCRIPTION

Figure 1:
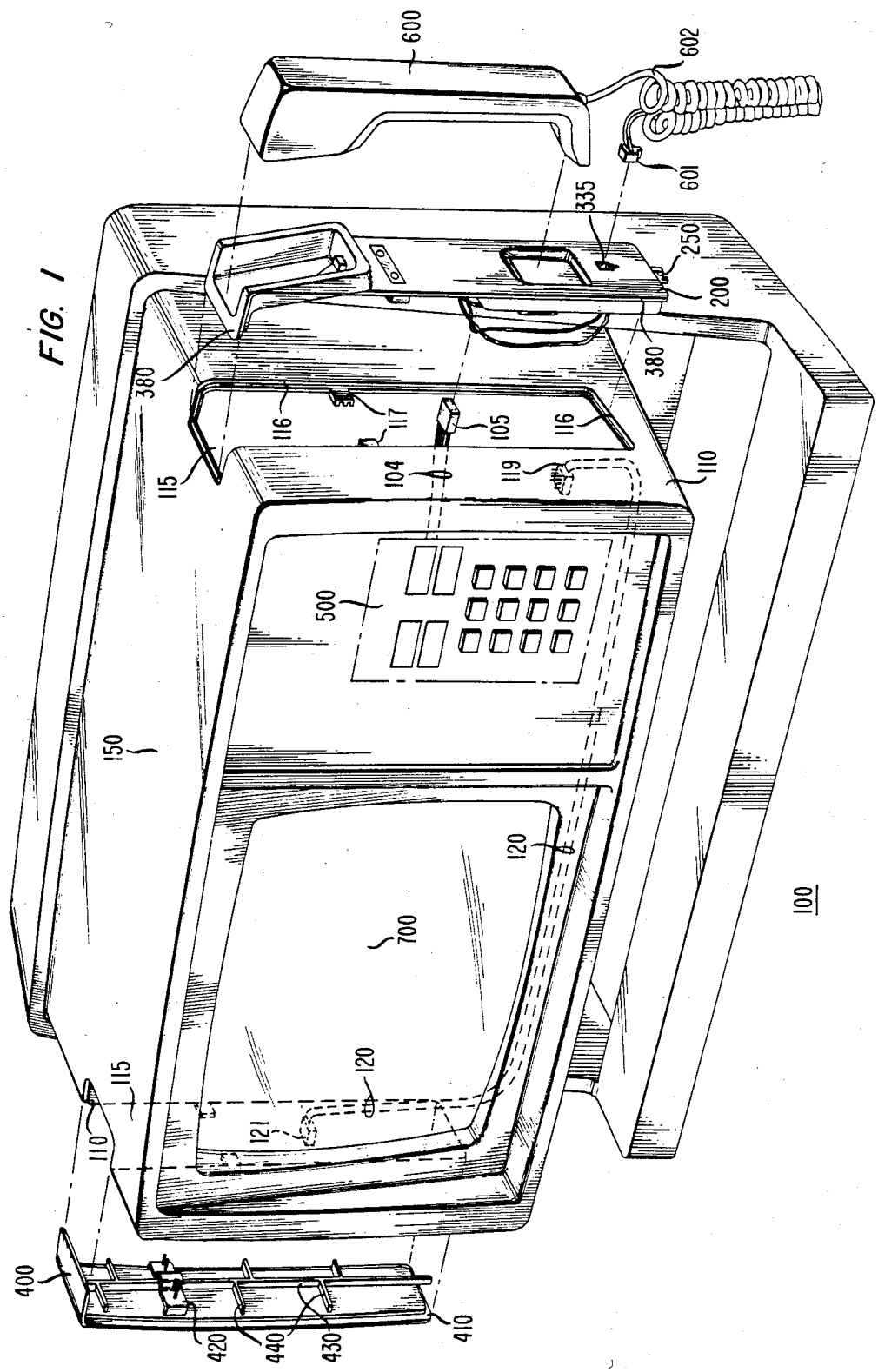
FIG. 1 is a perspective view of a terminal housing illustrating receiving apertures on opposite side portions thereof and illustrating a cover plate in alignment with one aperture and a modular cradle assembly with a telephone handset in alignment with the opposite aperture.

Referring to FIG. 1. there is shown communication terminal 100 having a cathode ray tube, or display, 700 and station set 500 enclosed by housing or cabinet 150. Housing 150 may be plastic designed to be injection molded as a one-piece unit using either Cycolac manufactured by Borg-Warner or Noryl manufactured by General Electric. Housing 150 is arranged with identical molded in vertically oriented apertures 115 positioned on opposite side surfaces of housing 150.

Each aperture 115 is positioned vertically along its respective surface 110 and extends horizontally into the top surface of housing 150 and are mirror images of each other for receiving switchhook (hookswitch)) and cradle assembly 200. The edge portion of housing 150 describing each aperture 115 is arranged as a step or recess lip 116 for mating with cradle assembly 200 such that cradle assembly 200 or, alternatively, cover plate panel 400 mounts flush with the surface of housing 150. In this manner, cradle assembly 200 or cover plate 400 appears to be an integral part of housing 150 when in place.

As will be explained, each aperture 115 is equipped with molded-in tabs or ears 117 for securely fastening either cradle assembly 200 or cover plate 400 to housing 150.

Cradle assembly 200 can be plastic designed as a molded one piece unit in the same manner that housing 150 is molded. The dimensions of cradle assembly 200 flange portions 380 or cover 400 flange portions 410 are more or less equal to the dimensions (shape and thickness) of step 116 of housing 150 describing either of the apertures 115. Upon slidably inserting or engaging either cradle assembly 200 or cover 400 into aperture 115 flange 380 (or flange 410) mate exactly with step 116 and the outer edges are even (flush) with the top and side surfaces of housing 150.

Figure 2:
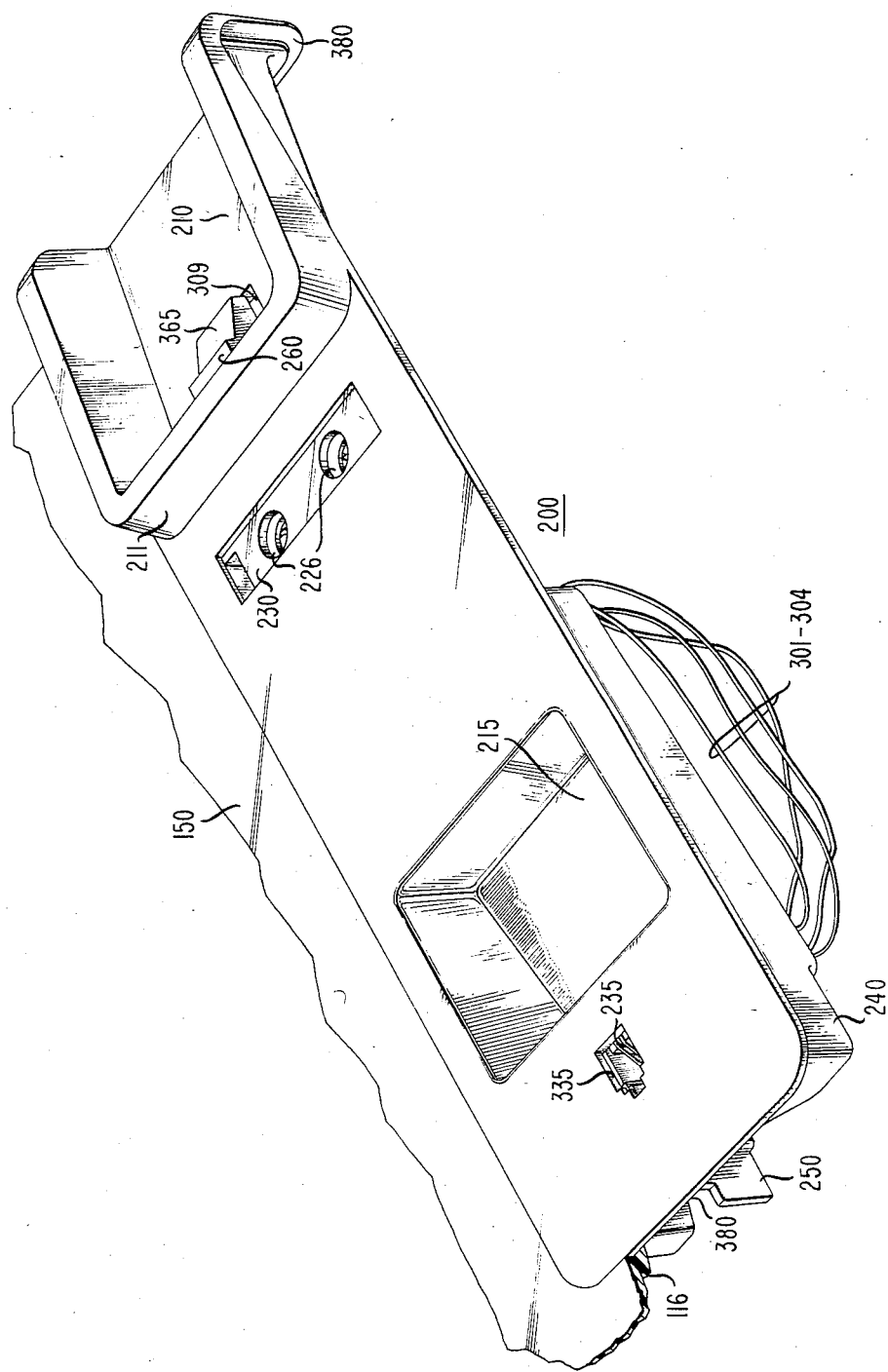
FIG. 2 is a front view of the modular switchhook and cradle assembly.

Just prior to slidably inserting cradle assembly 200 (top to bottom) into aperture 115 connector 105 is connected to terminals 360 (shown in more detail in FIG. 3) of cradle assembly 200 in order to establish a communication path between handset 600 and station set 500 upon inserting modular telephone plug 601 of handset 600 into modular telephone jack 335 (shown in more detail in FIG. 2).

Six conductor cable 104 connected to station 500, as will be discussed, can be extended using cable extension 120 terminated in connector 121 for allowing cable assembly 200 to be electrically connected to station 500 when inserted into the left side surface of housing 150. Thus, the arrangement of cable 120 eliminates the tedious task of moving a single cable, such as cable 104, to either side of housing 150 when relocating cradle assembly 200 from one side of housing 150 to the opposite side of housing 150.

Cover plate 400 is inserted vertically (top to bottom) into the unused aperture 115 in the same manner as cradle assembly 200 is inserted into the used aperture 115. Cover plate 400 can be plastic designed as a molded one piece unit having molded-in vertical rib 430 and molded-in horizontal ribs 440 for strengthening cover plate 400.

Retaining plate 420 shown in FIG. 1 is the same as retaining plate 320 (FIG. 3) attached to cradle assembly 200 and is used to secure cover plate 400 housing 150. As will be discussed, an explanation of securing cradle assembly 200 to housing 150 using retaining plate 320 equally pertains to securing cover plate 400 to housing 150 using retaining plate 420.

Referring to FIG. 2 there is shown a front view of cradle assembly 200 in almost registration with a cutaway portion of housing 150. The depth and shape of molded-in wedged shaped wells 210 and 215 are arranged to match the depth and shape of the receiving and transmitting portions of handset 600, (FIG. 1), respectively. It is to be understood that wells 210 and 215 may be arranged to receive handsets of different shapes.

U-shaped wall 211 which forms well 210 protrudes outward and diminishes in height to form a portion of flange 380, which mates with housing aperture lip 116. Molded-in wall 211 forming well 210 is of sufficient depth to securely receive and hold in place the receiving portion of handset 600 which rests on molded-in block 260 and plunger 365. As will be discussed, handset 600 when inserted into wells 210 and 215 pushes plunger 365 backward into cradle assembly 200 thereby causing switchhook contacts 306 and 307 (FIG. 3) to operate and come into contact with each other.

Retaining plate 320 (FIG. 3) is secured to cradle assembly 200 by threaded screws 225 which pass through apertures 226 and which are then threaded into threaded holes of retaining plate 320.

Molded-in apertures 226 (FIG. 2) are formed in recess 230 and are covered using a strip of paper or fiberboard having the telephone or extension number of station 500 printed thereon. A clear plastic strip of the same dimensions as recess 230 is then inserted into recess 230 to protect the printed telephone number.

As shown, the shape of molded-in aperture 235 is arranged to receive modular telephone jack 335.

Molded-in u-shaped rib guard or wall 240 enclosing the bottom portion of modular cradle assembly 200 extends sufficiently outward to protect cradle assembly 200 from being damaged when cradle assembly 200 is placed on a flat surface, such as a desk or table.

Molded-in cradle assembly 200 bottom retainer 250 is shaped to provide a gap between bottom retainer 250 and the bottom portion of flange 380 and to extend slightly outward from flange 380. Bottom retainer 250 clips behind housing 150 forming the lower part of aperture 115 (FIG. 1) thereby preventing the bottom portion of cradle assembly 200 from moving away from housing 150 when inserted into aperture 115.

Figure 3:
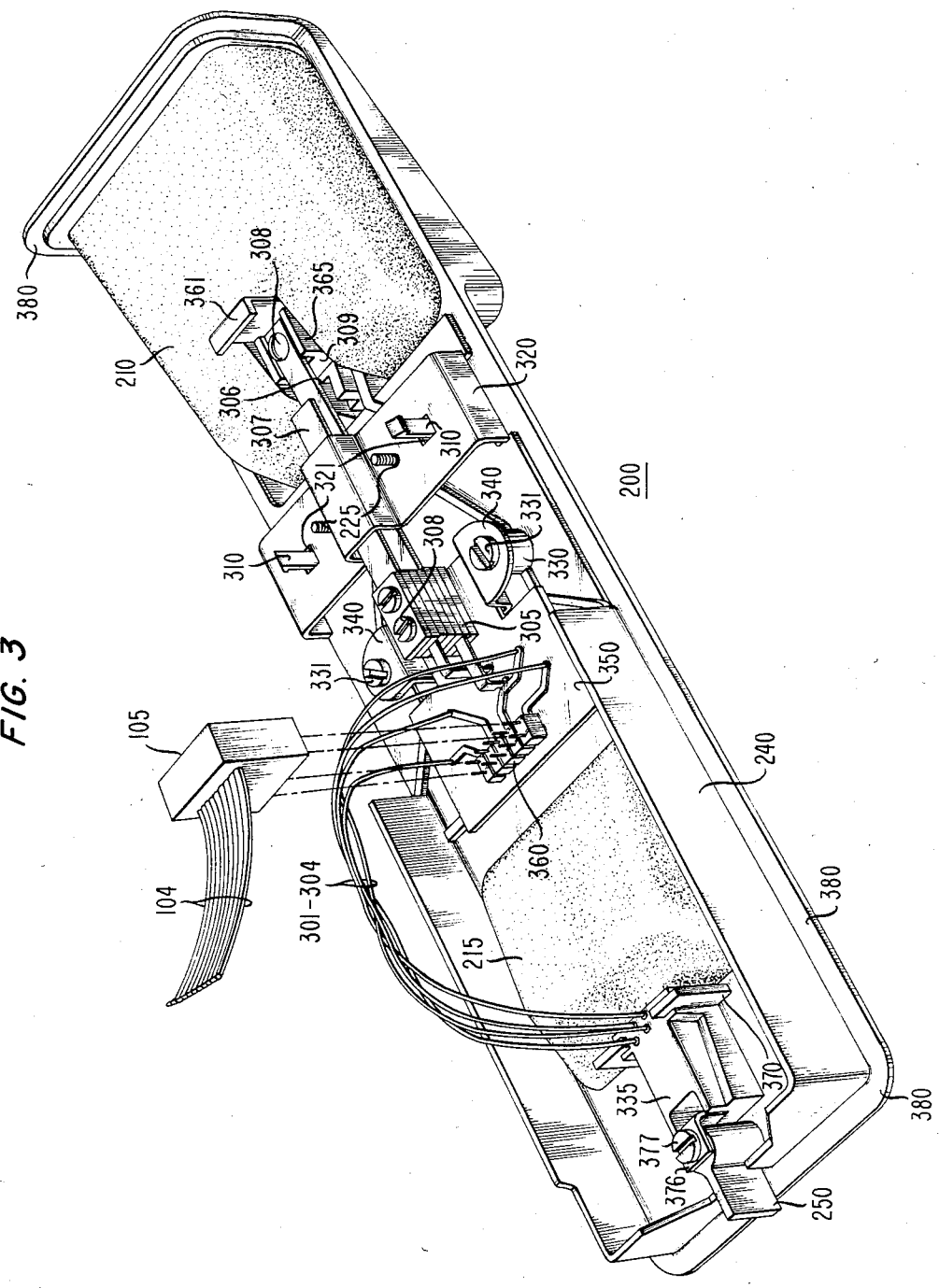
FIG. 3 is a back or rear view of the modular switchhook and cradle assembly.

FIG. 3 shows the back or reverse side of modular cradle assembly 200 in which plunger 365 is fastened to movable spring contact 306 of contact assembly 305. As is well known in the art, plunger 365 causes spring contact 306 and stationary contact 307 to operate whenever handset 600 is inserted into cradle 200 which pushes plunger 365, and in turn spring contact 306, into stationary contact 307 thereby establishing the on-hook condition. On the other hand, when handset 600 is removed from cradle assembly 200 spring contact 306 is free to travel pushing plunger 365 into aperture 309 and into well 210 thereby breaking contact with stationary contact 307 of contact assembly 305, and thereby establishing the off-hook or request for service condition. Conversely, contacts 306 and 307 could be arranged to break when handset 600 is inserted into cradle assembly 200 and be operated when handset 600 is removed from cradle 200.

Cradle assembly 200 is also equipped with molded-in stop 361 which prevents plunger 365 from being completely pushed out of aperture 309 and changing the adjustment of spring contact 306 and contact 307.

Apertures 321 of cradle retainer 320 register with molded-in retaining posts 310 for positioning and aligning retainer 320 with respect to modular cradle assembly 200. As shown, the end of molded-in retaining post 310 is shaped to form a hook to prevent the complete disengagement of retainer 320 from cradle assembly 200 whenever screws 225 are completely removed. Thus, if a user upon disengaging modular switchhook and cradle assembly 200 from housing 100 accidently removes screws 225 retaining posts 310 will keep retainer 320 in proper position with respect to cradle 200 for receiving screws 225.

Prior to inserting modular cradle assembly 200 into one of the apertures 115 (FIG. 1) screws 225 are loosened allowing retainer 320 to separate slightly from cradle 200. Upon inserting cradle assembly 200 into one of the apertures 115, retainer 320 is automatically positioned behind tabs 117 (FIG. 1) of the used aperture 115. By threading screws 225 into retainer 320, the end portions of retainer 320 tightly press against tabs 117 thereby securing cradle assembly 200 to housing 150. In the same manner, cover plate 400 (FIG. 4) is secured to housing 150.

Interchanging the positions of cradle assembly 200 and cover plate 400 is easily accomplished by loosening the screws 225 which secure cradle assembly 200 and cover plate 400 to housing 150 tabs 117, respectively. Cover plate 400 may then be removed from housing 150 by raising cover plate 400 vertically to disengage retainer 420 from the respectively molded-in tabs 117. In the same manner, cradle assembly 200 is disengaged from housing 150 with the added step of unplugging jack 121 from multipin connector 365.

Reengaging cradle assembly 200 and cover plate 400 to housing 150 proceeds as discussed above.

Continuing in FIG. 3, contact assembly 305 and printed wiring board 350 collectively fasten to retainer 340 by screws 308 passing through contact assembly 305 and printed wiring board 350 and threading into retainer 340. Retainer 340 fastens to molded-in retainer posts 330 by passing screws 331 through retainer 340 apertures (not shown) and threading into molded-in retainer posts 330. Retainer 340 secured to cradle 200 in this manner automatically aligns spring contact 306 and plunger 365 with well aperture 309.

As shown in FIG. 3, the ends of contacts 306 and 307 are preformed for insertion into printed wiring board 350.

Standard modular telephone jack 335 slidably engages molded-in guides 370 for positioning jack 335 into and with respect to jack aperture 235. Modular jack 335 is secured to cradle assembly 200 by fastening L-shaped bracket 376 to the molded-in binding post portion of bottom retainer 250 using screw 377. Leads 301–304 extend the terminals of modular jack 335 to printed wiring board 350 which then connect to connector 360 via printed wiring paths.

As will be discussed, inserting jack 105 into connector 360 completes the communication and control path between modular cradle 200 and station set 500. Transmit and receive communications between handset 600 and station 500 are possible upon the insertion of modular plug 601 into modular jack 335.

Figure 4:
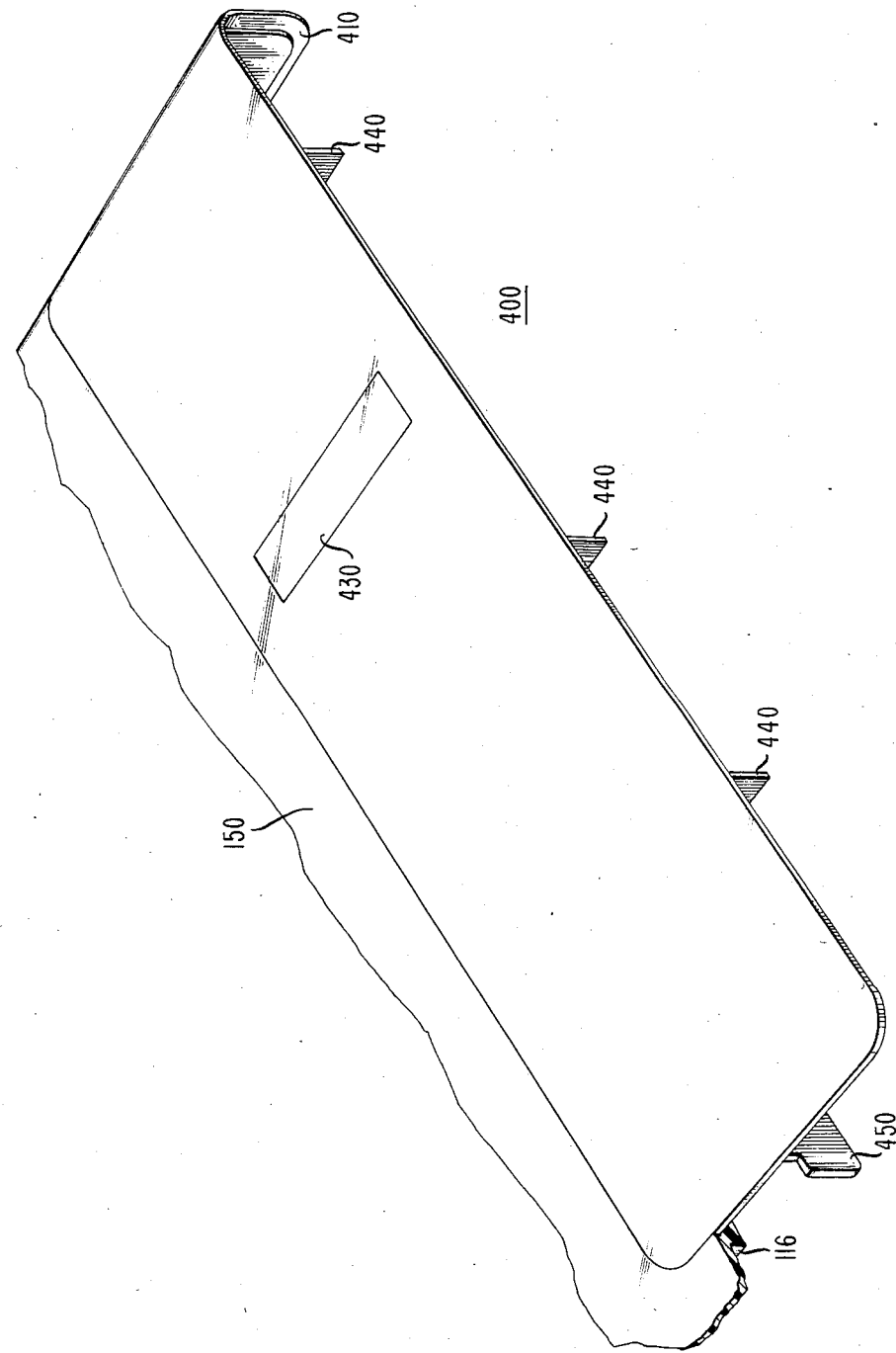
FIG. 4 is a perspective view of the aperture cover plate.

Referring now to FIG. 4, there is shown the front view of molded-in cover plate 400 in almost registration with a cut-away portion of housing 150 that defines unused aperture 115. Recessed rectangular well 430 having two apertures for passing threaded screws (not shown) through cover plate 400 and into threaded holes of retainer 420 (FIG. 1) is shown covered using a rectangular strip of plastic for hiding from view the retainer screws (not shown). The shape of molded-in end post 450 formed at the bottom end of vertical rib 430 is similar to the shape of cradle 200 end post 250 and is used, as discussed, to prevent the bottom portion of cover plate 400 from moving away from housing 150 when inserted into one of the apertures 115.

Figure 5:
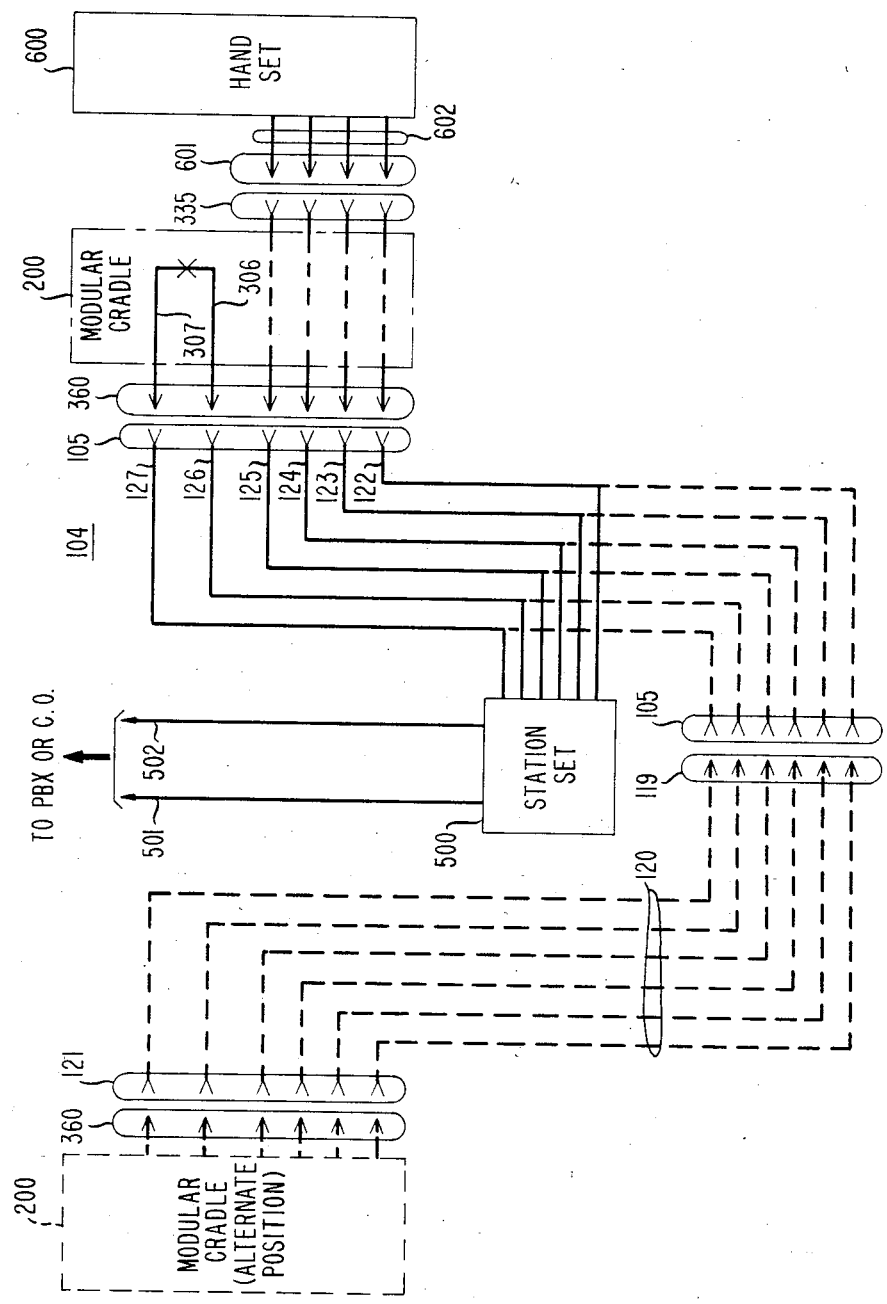
FIG. 5 is a block diagram showing the connection between the terminal station set, modular switchhook and cradle assembly and telephone handset.

FIG. 5 shows the electrical and communication connection between station set 500, modular cradle assembly 200 and handset 600 in block diagram form. Such connections are well known in the art of telephony and will only be briefly described herein.

In our preferred embodiment station set 500 and handset 600 comprise a digital telephone station set, such as the digital stations set employed in the Bell System's Dimension System 85. However, it is well known to the art that an analog station set could be substituted for the digital station set. In this instance, wells 310 and 315 could be readily changed from the design shown in FIG. 2 to accept the handset employed with such a station set.

As shown in FIG. 5, leads 501 and 502 may connect to a digital PBX or a central office line in order to establish a voice communication path between terminal 100 and another terminal (not shown). Leads 122–127 of cable 104 terminate in jack 105 (FIG. 1). Jack 105 connects directly to plug 360 soldered to printed wiring board 350 of modular cradle 200 whenever modular cradle 200 is positioned on the right side of housing 150. Jack 105 connects to plug 360 via extension cable 120 whenever modular cradle 200 is positioned on the left side of housing 150. In the latter instance jack 105 connects to plug 119 of cable 120 and jack 121 of cable 120 connects to plug 360, as shown in phantom in FIG. 5.

The communication path between handset 600 and station set 500 is established upon connecting jack 105 with plug 360 of modular cradle assembly 200 and upon connecting modular telephone plug 601 with modular telephone jack 335 (FIG. 3) of modular cradle assembly 200. Leads 122 and 123 of cable 104 supply battery (such as +5 volts) and ground to handset 600 to power the transmitting and receiving circuits of handset 600. Leads 124 and 125 of cable 104 establish the transmission path between handset 600 and station set 500. Leads 126 and 127 of cable 104 connect to spring contacts 306 and 307 (shown operated), respectively, via printed wiring board 350 (not shown in FIG. 5) of modular cradle assembly 200.

As discussed above, spring contacts 306 and 307 unoperated generate the well known off-hook condition as a means of requesting service. Contacts 306 and 307 operated, such as by placing handset 600 in wells 210 and 215 of modular cradle assembly 200, generate the well known on-hook (idle) signal.

CONCLUSION

It should be obvious to one skilled in the art that the invention disclosed herein is not limited to the embodiment disclosed in the accompanying drawings and foregoing detailed description, but can be arranged through the substitution, addition and/or deletion of components and functions without departing from the scope and spirit of the invention.

For example, a pair of "break" spring contacts can be readily substituted for the "make" contacts disclosed herein. The modular cradle wells can be rearranged to accept different types of handsets. Cable 120 can be terminated in two jacks; one connecting directly to the switchhook contacts and the other used to replace the modular telephone jack associated with the modular cradle.

Also, the modular cradle can be fitted with molded-in spring type locking tabs which lock or snap into housing slits to secure the modular cradle to the terminal housing as opposed to using the modular cradle retaining clamp and associated screws.

What is claimed is:

1. A communication terminal comprising
a housing having at least spaced-apart first and second surfaces, said spaced-apart first and second surfaces having respective apertures formed therein,
a cable, one end of said cable being connected to a station set within said communication terminal and another end of said cable being extendable to the apertures formed in said first and second surfaces, a modular telephone cradle, said cradle being adapted to electrically connect to said other end of said cable to extend an electrical path from said station set to said cradle and being adapted to be removably insertable into the respective apertures formed in said first and second surfaces such that said modular cradle is substantially flush with said first surface when it is inserted into the aperture formed in said first surface and it is substantially flush with said second surface when it is inserted into the aperture formed in said second surface, and a modular cover plate, said modular cover plate being adapted to be removably insertable into the respective apertures formed in said first and second surfaces such that said modular cover plate is substantially flush with said first surface when it is inserted into the aperture formed in said first surface and it is substantially flush with said second surface when it is inserted into the aperture formed in said second surface.

2. A communication terminal cabinet adapted to house a telephone station set in communication with a telephone handset, comprising at least first and second cabinet surfaces arranged in spaced-apart relationship, said first and second surfaces having respective apertures formed therein, a modular telephone cradle adapted to receive said handset, said modular cradle being further adapted to be inserted into the aperture formed in said first surface and to be inserted into the aperture formed in said second surface, said cradle having means to establish an electrical connection between said station set and said handset, and a modular cover plate adapted to be inserted into the aperture formed in said second surface when said modular cradle is inserted into said first surface and being further adapted to be inserted into the aperture formed in said first surface when said modular cradle is inserted into said second surface.

3. The invention set forth in claim 2 wherein said modular cover plate substantially conforms with the shape of said cabinet when said modular cover plate is inserted into the aperture formed in said first surface and when it is inserted into the aperture formed in said second surface.

4. A communication terminal having a display comprising a housing, said housing including first and second side surfaces, said first and second side surfaces having respective apertures formed therein, said display located at a front surface of said housing, a modular telephone cradle, said modular cradle being adapted to be inserted into the aperture formed in said first surface and to be inserted into the aperture formed in said second surface, and a modular cover plate, said modular cover plate being adapted to be inserted into the aperture formed in said first surface and to be inserted into the aperture formed in said second surface such that it is inserted into said second surface when said modular telephone cradle is inserted into said first surface and it is inserted into said first surface when said modular telephone cradle is inserted into said second surface.

5. The invention set forth in claim 5 wherein said modular cover plate is substantially flush with said housing when it is inserted into said first side surface and when it is inserted into said second side surface.

6. A communication terminal, said communication terminal including a telephone station set in communication with a telephone handset, comprising a housing having spaced-apart first and second surfaces, said first and second surfaces having respective apertures formed therein, a cable, one end of said cable being connected to said telephone station set and another end of said cable being extendable to the respective apertures formed in said first and second surfaces, a modular cradle, said modular cradle including means for receiving said other end of said cable and an end of a cable connected to said telephone handset and for electrically interconnecting said ends, said modular cradle being adapted to be inserted into the aperture formed in said first surface and to be inserted into the aperture formed in said second surface, and a modular cover plate, said modular cover plate being adapted to be inserted into the aperture formed in said first surface and to be inserted into the aperture formed in said second surface.

7. The invention set forth in claim 6 wherein each of said apertures extends into a third surface of said housing.

8. The invention set forth in claim 6 wherein each of said spaced-apart first and second surfaces has a molded-in lip which defines the perimeter of a respective one of said apertures formed therein, said respective lips making contact with said modular cradle when said modular cradle is inserted into the aperture formed in said first surface and when it is inserted into the aperture formed in said second surface.

* * * * *